United States Patent
Couzin et al.

(10) Patent No.: US 7,427,139 B2
(45) Date of Patent: Sep. 23, 2008

(54) RETROREFLECTOR WITH CONTROLLED DIVERGENCE MADE BY THE METHOD OF GROOVE UNDULATION

(75) Inventors: Dennis I. Couzin, Evanston, IL (US); Sidney A. Heenan, deceased, late of Northbrook IL (US); by Ronald A. Sandler, legal representative, Chicago, IL (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 11/216,564

(22) Filed: Aug. 31, 2005

(65) Prior Publication Data

US 2006/0007543 A1    Jan. 12, 2006

Related U.S. Application Data

(62) Division of application No. 10/167,135, filed on Jun. 11, 2002, now Pat. No. 6,984,047.

(60) Provisional application No. 60/297,394, filed on Jun. 11, 2001.

(51) Int. Cl.
*G02B 5/124* (2006.01)

(52) U.S. Cl. ..................... 359/530; 428/167

(58) Field of Classification Search .............. None
See application file for complete search history.

(56) References Cited

U.S. PATENT DOCUMENTS

| | | | | |
|---|---|---|---|---|
| 3,384,348 | A | 5/1968 | Wicker | 254/10.5 |
| 3,712,706 | A | 1/1973 | Stamm | 350/103 |
| 3,833,285 | A | 9/1974 | Heenan | 350/103 |
| 4,478,769 | A | 10/1984 | Pricone et al. | 264/1.6 |
| 4,775,219 | A | 10/1988 | Appeldorn et al. | 350/103 |
| 4,938,563 | A | 7/1990 | Nelson et al. | 350/103 |
| 5,122,902 | A * | 6/1992 | Benson | 359/529 |
| 5,516,469 | A | 5/1996 | Santoh et al. | 264/1.33 |
| 6,015,214 | A | 1/2000 | Heenan et al. | 359/529 |
| 6,253,442 | B1 | 7/2001 | Benson et al. | 29/557 |

FOREIGN PATENT DOCUMENTS

WO    96/30786    10/1996

OTHER PUBLICATIONS

"Study of Light Deviation Errors in Triple Mirrors and Tetrahedral Prisms", P.R. Yoder, Jr., J. Optical Soc. Amer., vol. 48, No. 7, pp. 496-499, 1958.

* cited by examiner

*Primary Examiner*—James Phan
(74) *Attorney, Agent, or Firm*—Renner, Otto, Boiselle & Sklar, LLP

(57) ABSTRACT

A ruling of cube corner elements comprising intersecting ruled vee-grooves is characterized in that at least one of the vee-grooves is made such the substrate being ruled and the cutting tool are oscillated with respect to one another during the ruling of the vee-groove. Rulings made in accordance with the instant invention can be designed to produce a cube corner element having broader divergence.

6 Claims, 16 Drawing Sheets unaberrated, uncanted, alpha to 3° aluminized, unaberrated, uncanted, alpha to 3° unaberrated, -9.74° cant, alpha to 3° unaberrated, +11.17° cant, alpha to 3°

14, 14, 14, alpha to 3° sinusoidal undulation, alpha to 3°

G3 sinusoidal undulation, alpha to 3°

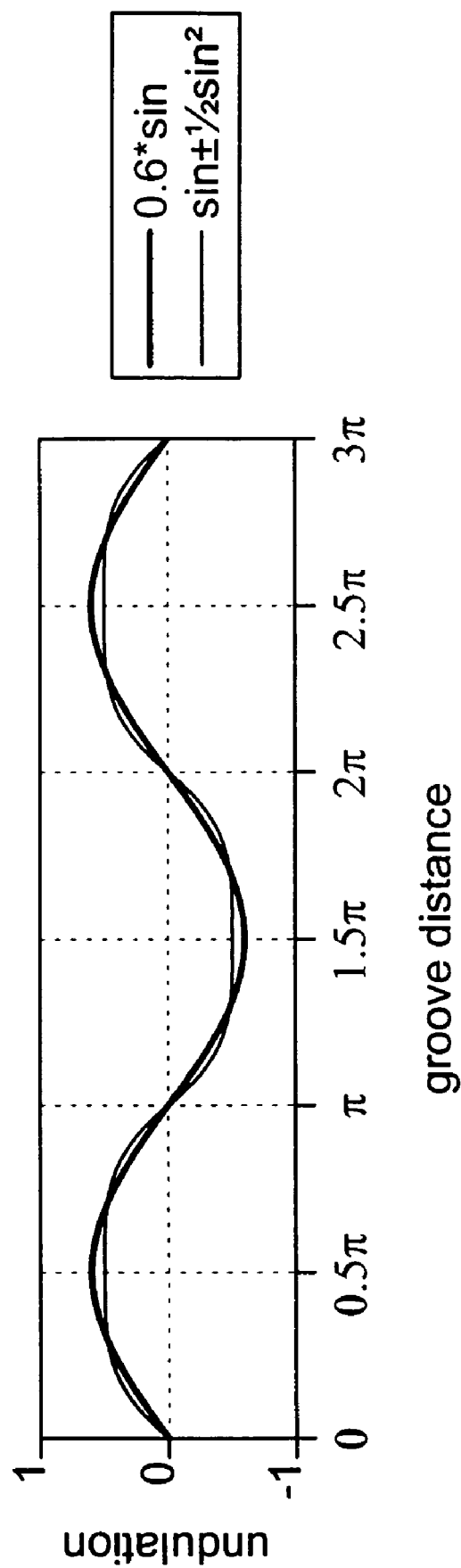
FIG. 8 Comparison of 0.6*sin undulation with sin+½sin² undulation

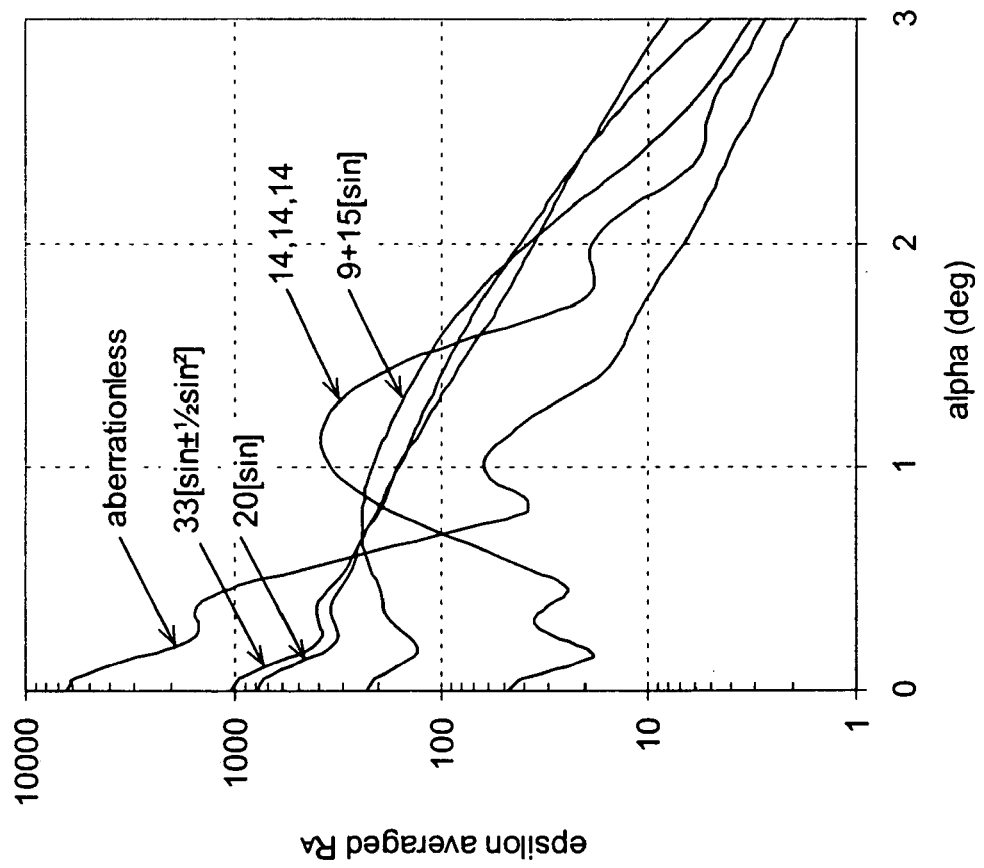
FIG. 9   Observation angularity for the aberrationless and four aberrated triangle cube corners

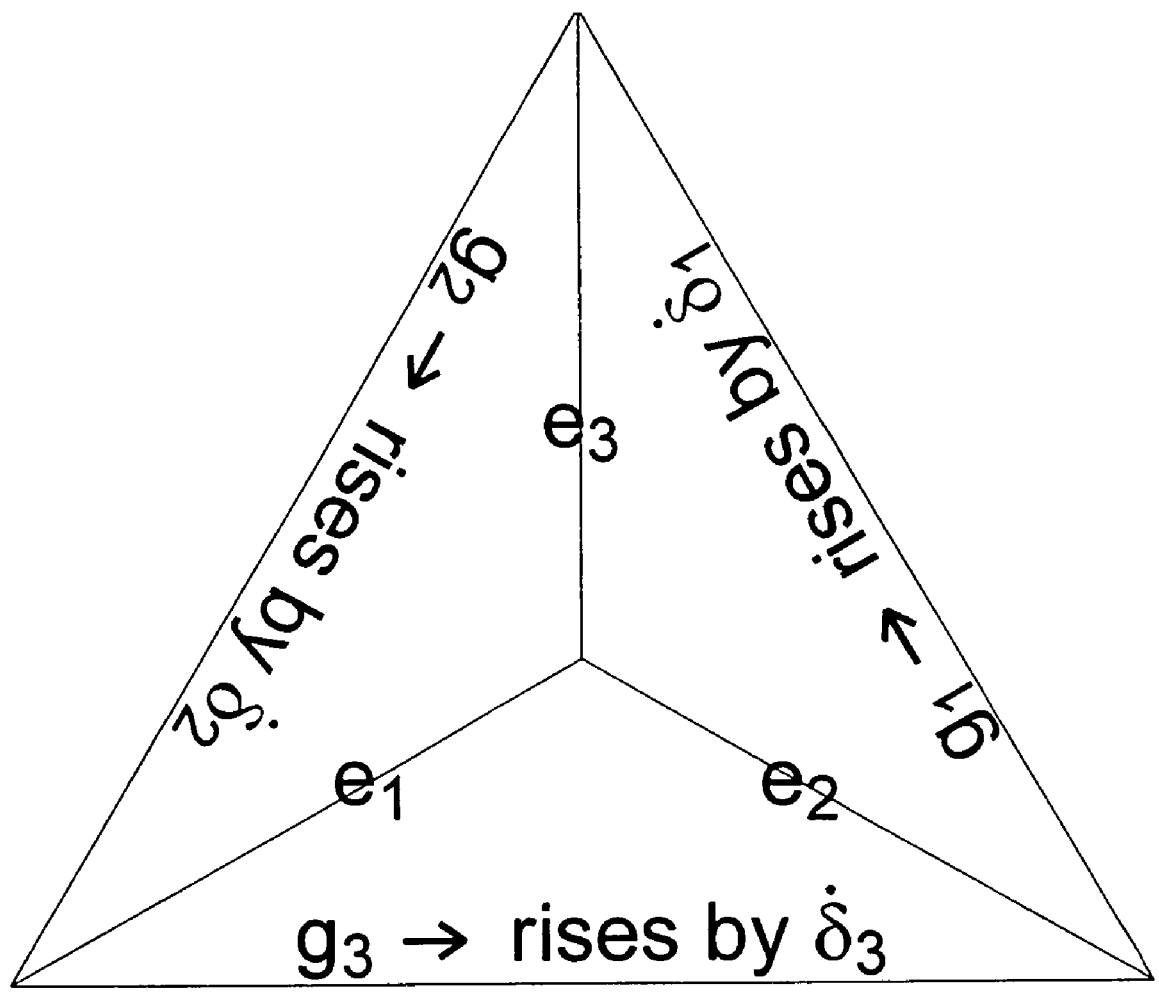
FIG. 10  First Mode

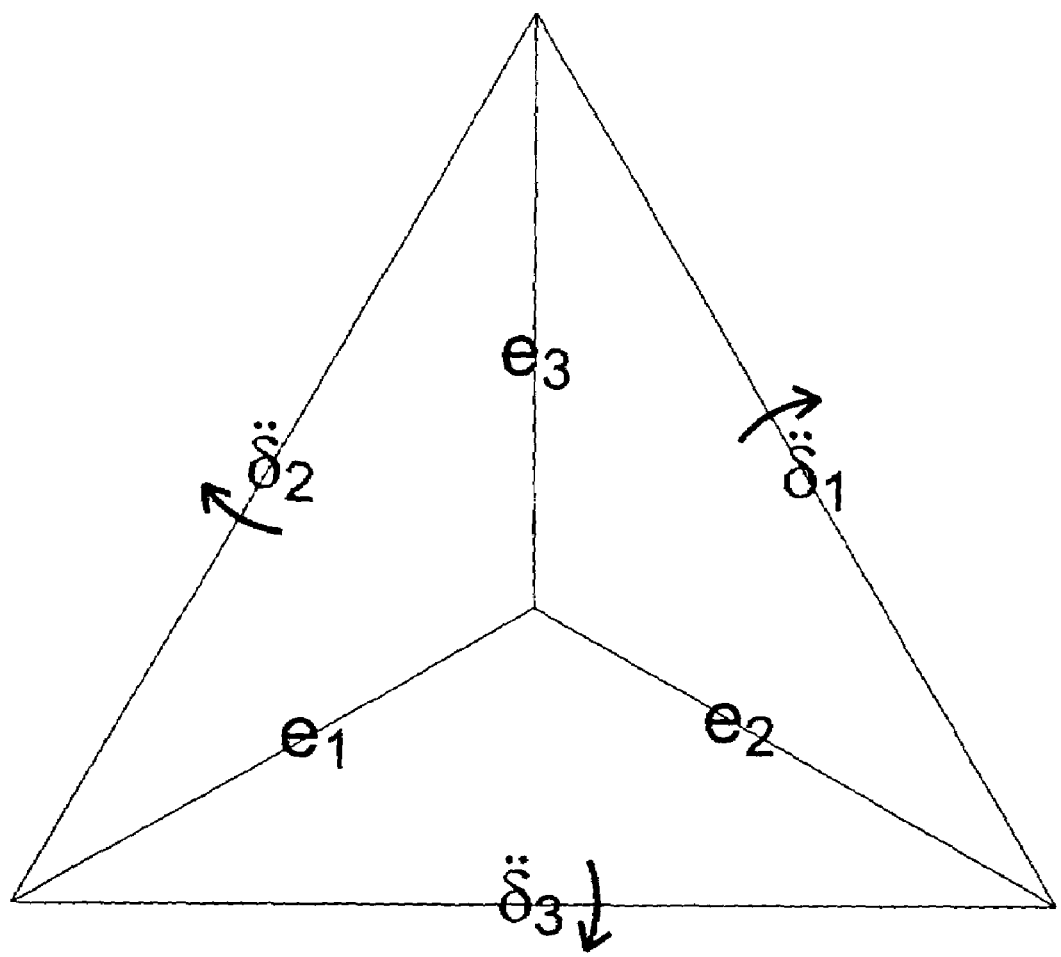
FIG. 11 Second Mode

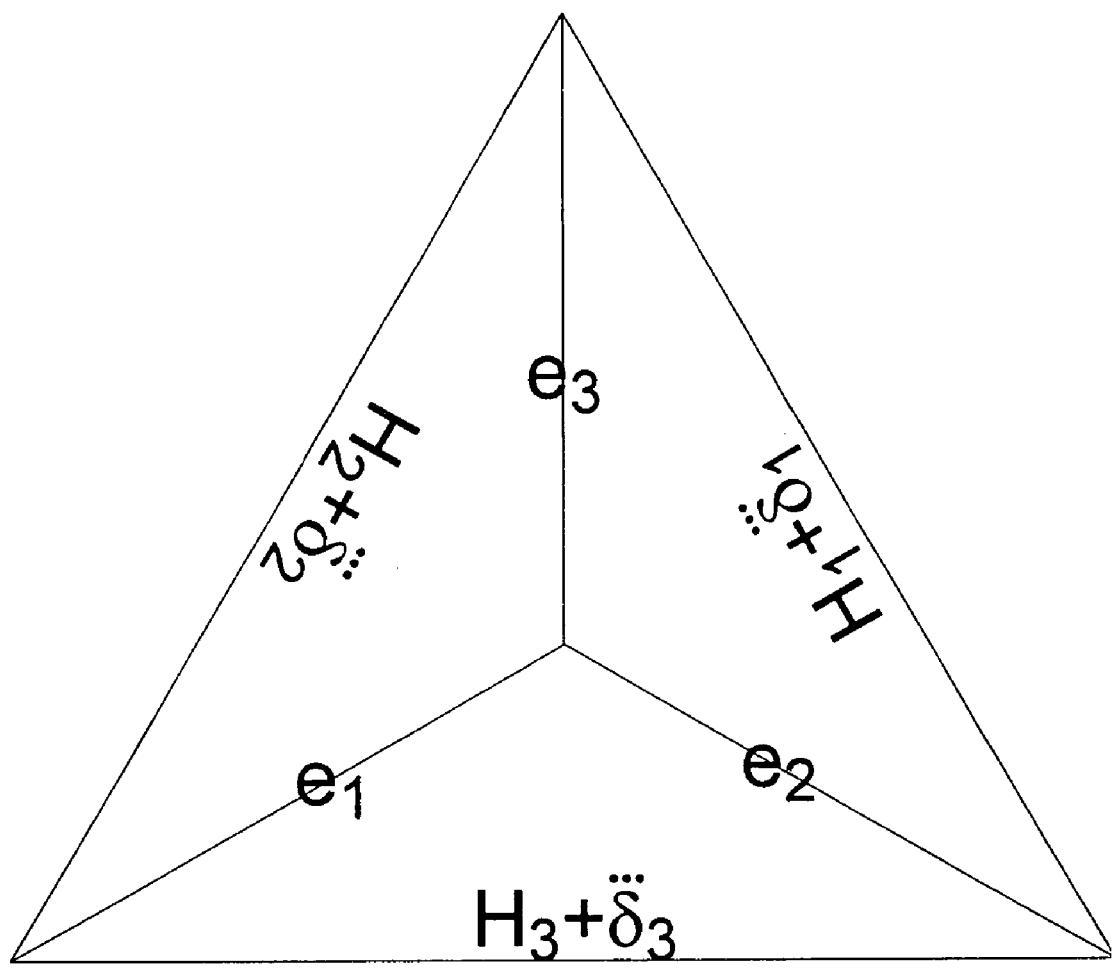
FIG. 12 Third and Fourth Modes

RETROREFLECTOR WITH CONTROLLED DIVERGENCE MADE BY THE METHOD OF GROOVE UNDULATION

RELATED APPLICATIONS

This application is a divisional of, and claims priority under 35 U.S.C. § 120 to, and commonly assigned U.S. application Ser. No. 10/167,135 which was filed on Jun. 11, 2002, now U.S. Pat. No. 6,984,047, and which claimed priority under 35 U.S.C. §119(e) to U.S. Provisional Patent Application No. 60/297,394 filed Jun. 11, 2001. The entire disclosures of these earlier applications are hereby incorporated by reference.

BACKGROUND OF THE INVENTION

This invention relates to a method of making a retroreflective article having controlled divergence, and articles made by the method.

It is well known that retroreflective articles can be made from an array of microcube corner elements. Such an array of microcube corner elements can be made by ruling a master of "male" cube corners into a planar surface of a plate. This is taught generally by Stamm U.S. Pat. No. 3,712,706; and also is taught in detail in Pricone U.S. Pat. No. 4,478,769. Each of these patents is incorporated herein by reference in its entirety.

U.S. Pat. No. 4,478,769 describes a well-known method of making triangular cube corner elements, in which the planar surface of a master plate is ruled with a diamond cutting tool that cuts a series of precise parallel vee-grooves. To rule equilateral triangular cube corners, three sets of parallel grooves intersecting one another at angles of 60° are made; each groove also will have an included angle of substantially 70.53° disposed symmetrically, and will be ruled to a groove depth determined by the height of the cube corners desired. This method automatically results in an array of pairs of oppositely oriented equilateral triangular microcubes on the face of the master. To rule non-equilateral triangle cube corners the grooves within the parallel sets will contain angles other than 70.53°, and intersect at angles other than 60°, as disclosed, for example in Rowland U.S. Pat. No. 3,684,348. Methods for ruling non-triangle cube corners generally do not use three sets of parallel symmetrically disposed vee-grooves, but the faces of the cube corners are nevertheless formed from the walls of grooves, as disclosed, for example in Nelson U.S. Pat. No. 4,938,563.

The ruled master may then be used to make a series of duplicates, such as by electroforming, and the duplicates are assembled together to form a single "mother" tool. The assembled "mother" tool is used to electroform molds, which then can be assembled into a tool capable of providing microcube retroreflective elements on a web of plastic sheeting material such as by embossing, casting, or other methods known in the art.

Microcube corner retroreflective sheeting such as made by the method described above is used in highway safety applications such as highway signs and pavement markers. In such applications, the microcube corner elements retroreflect light from a vehicle's headlights back to the driver of the vehicle. This is an inexact retroreflection in which the divergence angle, $\alpha$, ranges between approximately 0° and more than 3°. The value of $\alpha$ operative in any given situation depends on the geometry of the vehicle and the distance from the vehicle to the retroreflective material. For example, the divergence angle $\alpha$ for a large truck's right headlight and its driver at a distance of about 40 meters from a road sign will be approximately 3°, while the divergence angle $\alpha$ for an automobile's left headlight and its driver at a distance of about 600 meters from a road sign will be approximately 0.05°.

Also associated with the divergence angle, $\alpha$, is a rotation angle, $\epsilon$, which is a measure of the direction of the divergence. The value of $\epsilon$ will be different for left and right headlights of a vehicle, and will also depend on the vehicle geometry and the position of the road sign.

Ideally, microcube corner retroreflective sheeting used in road signs will produce a pattern of retroreflected light having sufficient intensity over a range of divergence angle values and rotation angle values. For example, even a non-urban retroreflective highway sign should retroreflect light through a divergence angle $\alpha$ of about 1°, which corresponds to the value of $\alpha$ from a large truck's right headlight back to its driver at a distance of about 120 meters from the road sign.

Improvements in the precision with which microcube corner elements can be ruled in a master plate and duplicated by embossing have led to concerns that such microcube corner retroreflective sheeting may be retroreflective over only a very narrow range of divergence angle, such as about 0.0-0.5 degrees, as well as narrow ranges of rotation angle. It would be preferred to provide a ruled array with cube corners producing the entire desired range of divergence and within very short distances on the ruled array.

Light that is retroreflected by micro-sized cube corner elements will experience a certain amount of diffraction because of the very small size of the microcubes. Such diffraction will result in retroreflection over broader ranges of both divergence angle and rotation angle. The particular ranges of $\alpha$ and $\epsilon$ will depend on the particular diffraction pattern of a given microcube, which will depend in turn upon the cube size, cube shape, the index of refraction of the cube material, and upon whether or not the cube faces have been metallized. Diffraction, however, is not a desirable method to enhance retroreflection through broader divergence and rotational angle, because the very small microcubes that achieve greater diffraction also cause a substantial quantity of light to be retroreflected with a divergence angle $\alpha$ of greater than about 3°, where the light is not useful to the vehicle driver. This is summarized in Table 1.

Table 1 indicates the spreading of retroreflection due to diffraction. Acrylic equilateral triangle cube corners are used in each case. The millimeter dimension measures the edge length of the triangle (identically 2.449× the cube depth, or 1.155× the ruling spacing). The percentages indicate how much of the total retroreflected flux is within a 1°, 2°, or 3° maximum observation angle. For example, for the triangle cube corner with side 0.05 mm only 27.9% of the total retroreflected light arrives between 0° and 1° observation angles.

TABLE 1

| | Diffraction spreading of retroreflection from different size triangle cube corners | | | |
|---|---|---|---|---|
| | 0.4 mm | 0.2 mm | 0.1 mm | 0.05 mm |
| 0° to 1° | 91.6% | 82.5% | 66.7% | 27.9% |
| 0° to 2° | 95.7% | 91.6% | 82.4% | 66.6% |
| 0° to 3° | 97.1% | 94.4% | 88.9% | 79.1% |

Diffraction results in idiosyncratic patterns which are unlikely to distribute the retroreflected light in a manner that will be most useful to a vehicle's driver. This is shown in FIGS. 4 A-D.

It is known in the art to create intentional aberrations in cube corner elements by causing the dihedral angles of the cube corner elements to deviate slightly from 90°. The classic paper "Study of Light Deviation Errors in Triple Mirrors and Tetrahedral Prisms," *J. Optical Soc. Amer.*, vol. 48, no. 7, pp. 496-499, July, 1958 by P. R. Yoder, Jr., describes the well-known spot patterns resulting from such aberrations.

U.S. Pat. No. 3,833,285 to Heenan, assigned to the common assignee and incorporated herein by reference in its entirety, teaches that having one dihedral angle of a macro-sized cube corner element greater than the other two results in extended observation angularity in macrocubes, and specifically that the retroreflected light diverges in an elongated pattern.

U.S. Pat. No. 4,775,219 to Appledorn discloses retroreflective articles having tailored divergence profiles, wherein the cube corner elements are formed by three intersecting sets of parallel vee-grooves, and wherein at least one of the sets includes, in a repeating pattern, at least two groove side angles that differ from one another.

U.S. Pat. No. 6,015,214 to Heenan et al., assigned to the common assignee, teaches methods of forming microcubes by ruling vee-grooves into the edges of a plurality of flat plates, and discloses that the tilt angle of a cutting tool with respect to the surface of the edges being ruled can be adjusted continuously as each groove is cut as a function of the distance traveled by the cutting tool along the ruled surface.

It is thus one object of the invention to provide an article comprising an array of retroreflective microcube corner elements having controlled broader divergence.

It is another object of the invention to provide methods for making such an article.

SUMMARY OF THE INVENTION

A retroreflective article having a controlled broader divergence is provided by ruling one or more sets of generally parallel vee-grooves to form a plurality of cube corner elements, each vee-groove having two side walls that intersect at a groove root, in which ruling non-uniform deviations of the cube dihedral angles from exactly 90° are intentionally introduced by causing the cutting tool and the surface of the substrate to oscillate with respect to one another in a controlled manner during the ruling of at least one of the vee-grooves. The vee-groove so formed will be an undulating groove. The cube corner element dihedral angles having at least one face defined by a side wall of an undulating vee-groove will be non-orthogonal to varying extents, depending on the phase, frequency, and amplitude of the oscillation during ruling. This introduction of variable, controlled non-orthogonality of dihedral angles within very short distances of each other on a single ruled groove will result in a controlled broader divergence of the ultimate retroreflective article made from such ruled cube corner elements.

DESCRIPTION OF THE FIGURES

FIG. 4A is for an uncanted acrylic triangle cube, 0.2 mm base dimension, 0.082 mm ruling depth. FIG. 4B is for the identical cube corner when aluminized. FIG. 4C is for a −9.74° (face more parallel) canted acrylic triangle cube, 0.256 mm base, 0.091 mm ruling depth. FIG. 4D is for a +11.17° (edge more parallel) acrylic triangle cube, 0.194 mm base, 0.089 mm ruling depth. Cube sizes have been chosen having equal optical active areas for purpose of diffraction comparison.

FIGS. 6 A-B illustrate calculated diffraction patterns for the cube corner of FIG. 4A, but with aberrations in accordance with the first mode of the present invention.

FIG. 8 compares of two forms of undulation called "sin" and "sin±½ sin²".

FIG. 9 compares the calculated observation angularity of the prior art aberrationless triangle cube corner for FIG. 4A, with four triangle cube corners aberrated in accordance with the instant invention, being those for FIG. 5, FIG. 6A, the "sin±½ sin²" variant of FIG. 6A, and FIG. 6B.

FIG. 10 illustrates the application of equations (1)-(3) to the first described mode of the invention.

FIG. 11 illustrates the application of equations (4)-(6) to the second described mode of the invention.

FIG. 12 illustrates the application of equations (10)-(12) to the third and fourth described modes of the invention.

DETAILED DESCRIPTION OF THE INVENTION

Cube corner retroreflective articles made by a process including the step of ruling one or more sets of generally parallel vee-grooves in a surface with a vee-shaped cutting tool can be provided with a controlled broader divergence by oscillating the cutting tool and the substrate with respect to one another in a controlled manner as the tool cuts one or more vee-grooves. The controlled oscillation during ruling will result in an undulating vee-groove producing a controlled variation in the dihedral angles of the cube corner elements on either side of the undulating groove, which will controllably broaden the divergence of the ultimate retroreflective article. Preferably, an entire desired range of divergence will be provided over very short increments of groove length.

The term "attitude" as used herein shall mean the orientation of a defined axis of a cutting tool relative to the substrate surface to be ruled. The defined axis will begin at the tool tip and point generally away from the substrate surface.

The term "cube corner elements" as used herein includes those elements consisting of three mutually intersecting faces, the dihedral angles of which are generally on the order of 90°, but not necessarily exactly 90°.

The term "groove root" as used herein means the continuous curve defined by the motion of the point of the cutting tool under the surface being ruled. A "groove root" cut in accordance with the method of this invention can be either straight or wavy, depending on the mode of operation of the instant invention.

The term "groove angle" as used herein means the included angle, measured in a plane normal to the groove root, between the two walls of the groove cut into the surface by the cutting tool at any given point along the groove length.

The phrase "the cutting tool and the substrate oscillate with respect to one another," and substantial equivalents as used herein, shall mean that during the ruling of a vee-groove either the cutting tool oscillates with respect to the substrate, or the substrate oscillates with respect to the cutting tool, or both the cutting tool and the substrate oscillate at the same time, so as to create an undulating vee-groove.

The term "divergence" as used herein is the angle between a light ray that enters a retroreflecting element (e.g., a cube corner) and the light ray after leaving that element.

Figure 1:
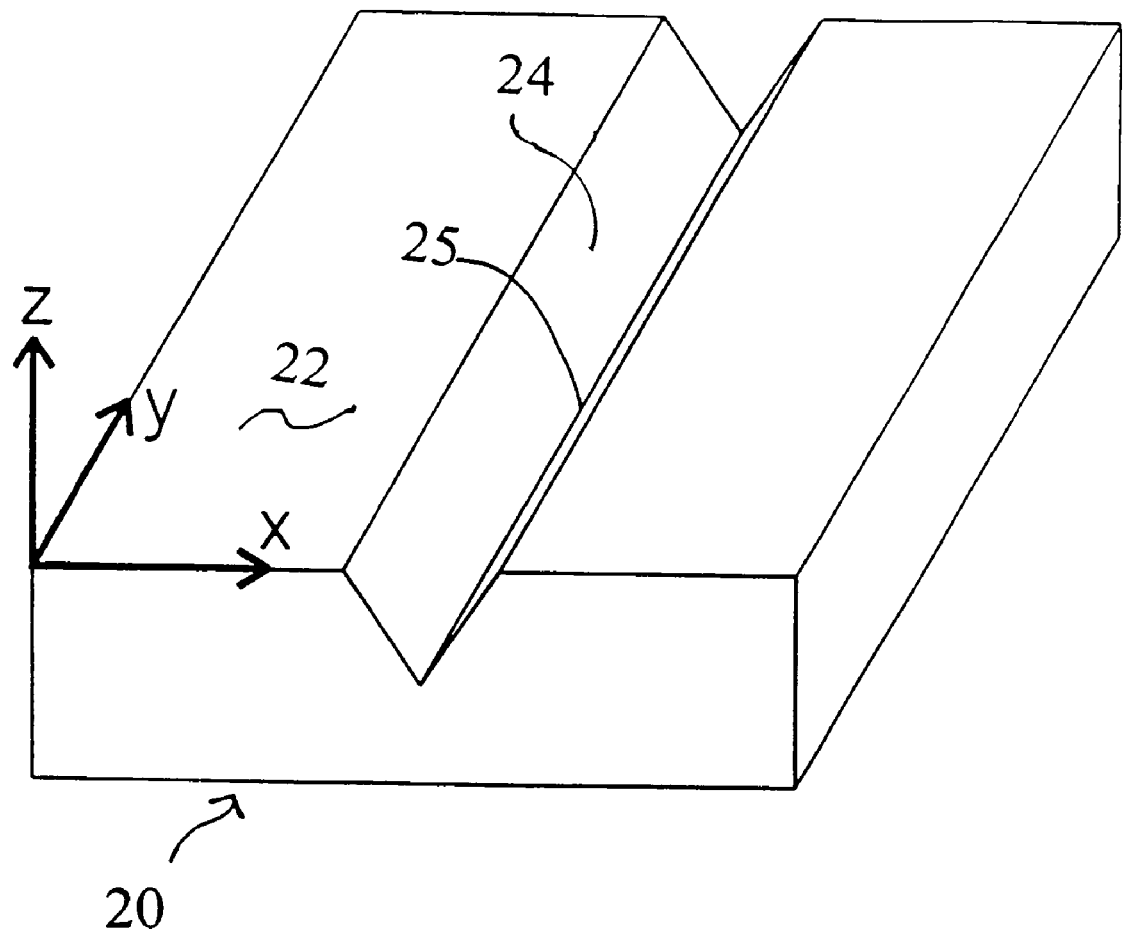
FIG. 1 illustrates a substrate oriented in the x-y plane and having a vee-groove ruled in the y-direction using the method of the prior art.

FIG. 1 illustrates a perspective view of a substrate 20 having a planar surface 22 on which vee-grooves can be ruled with a vee-shaped cutting tool, such as is known in the art. As illustrated in FIG. 1, the substrate 20 is oriented with the surface 22 to be ruled disposed in the x-y reference plane of the x-y-z orthogonal reference system, wherein the z direction is perpendicular to the surface 22. Throughout this patent, the terms "the x-y plane," "the x-z plane," and "the y-z plane," will mean the x-y reference plane, x-z reference plane, and y-z reference plane, as defined by the x, y, and z reference axes of FIG. 1. FIG. 1 further illustrates a typical vee-groove 24 of the prior art ruled parallel to the y-axis, with the groove root 25 being a straight line at a constant z-depth relative to the surface 22, and the groove having constant included angle.

It is to be understood that for rulings on a non-flat substrate, the methods of this invention will require small modifications obvious to one skilled in the art. Such modifications are considered to be within the scope of this invention.

The instant invention will be described in terms of four modes of operation. It will be understood, however, that these four modes of operation are not necessarily mutually exclusive, and that two or more such modes of operation can be employed simultaneously. For ease of understanding, the modes of operation are described and illustrated herein with respect to the simplest case in which the cube corner elements being ruled are uncanted equilateral triangles. The applicability of the instant invention is not so limited, however, and the methods of the invention can be applied to canted triangular rulings, and hexagonal and rectangular cube corner elements such as are illustrated and described in U.S. Pat. No. 5,914,813 (Smith et al.); U.S. Pat. No. 5,721,640 (Smith et al.); U.S. Pat. No. 4,938,563 (Nelson et al.); and U.S. Pat. No. 4,895,428 (Nelson et al.). Further, while the undulations illustrated and described herein are most easily imagined as sinusoidal, it will be appreciated that such sinusoidal undulations are not a requirement of the instant invention. There is only the requirement that the undulations must be piecewise smooth and that the tool accelerations be such that they will not break the tool or ruin the cutting. A single groove can be made in several consecutive parts, each of which includes some aspect of undulation.

By way of example and not by way of limitation, FIG. 8 illustrates two forms of undulation curves suitable for use in the various modes of operation of the instant invention. The curve labeled "sin" is a perfect sinusoid. The curve labeled "sin±½ sin²" follows the function sin−½ sin² from 0 to π and then the function sin+½ sin² from π to 2π, and continues to alternate between the two functions. The sin±½ sin² undulation, by having nearly flatted regions, gives more weight to the unaberrated cubes. In FIG. 8, the sin undulation was adjusted to 0.6*sin so as to produce the same average geometric divergence as the sin±½ sin² undulation, in order to provide a more appropriate basis of comparison. It will be understood that the horizontal and vertical scales of FIG. 8 require further adjustment to the dimensions of the cube corner ruling, such as shown in Table 2.

The two curves in FIG. 9 labeled "20[sin]" and "33[sin±½ sin²]" show the observation angularity for the sin and sin±½ sin² undulations illustrated in FIG. 8, respectively. Both undulations were chosen to give average geometric divergence of 1.1°. The bracket notation used in this application for denoting undulatory designs describes the extent of undulation. "20[sin]" denotes sinusoidal undulation of such amplitude and pitch that the single such groove contributes a maximum of 20 arc minutes of dihedral angle error in the ruling. "33[sin±½ sin²]" denotes sin±½ sin² undulation of such amplitude and pitch that the single such groove contributes a maximum of 33 arc minutes of dihedral angle error in the ruling. That both rulings produce the same 1.1° average geometric divergence in the acrylic product is explained by the sin±½ sin² undulation having nearly flatted regions and thereby producing a greater proportion of nearly unaberrated cubes in the population. Undulations useful for the present invention do not have to be perfectly periodic and do not have to follow any explicit mathematical functions.

The four simplest modes of operation of the invention are explained below. In the following discussion, the notation $\delta$ shall mean the change in the rise or fall of each groove root introduced by the first mode of operation of the instant invention; the notation $\delta$ shall mean the change in the direction of the groove root within the x-y plane introduced by the second mode of operation of the instant invention; and the notation $\delta$ shall mean the change in the half angles of the respective grooves as ruled in accordance with both the third and fourth modes of operation of the instant invention.

First Mode—Vertical Undulation

In a first mode of operation of the instant invention, the cutting tool is maintained at a constant attitude with respect to the substrate, and during the ruling of at least one vee-groove the cutting tool and the substrate oscillate with respect to one another in a vertical direction, i.e., in a direction parallel to the z-axis of FIG. 1. This will result in a vee-groove having a non-constant groove angle. The resulting groove root is a vertically undulating curve. The two-dimensional projection of the groove root in the x-y plane is a straight line. However, the intersection of the groove wall with the x-y plane is a horizontally undulating curve. In accordance with the definition of the phrase "the cutting tool and the substrate oscillate with respect to one another" as set forth above, it will be appreciated that the same effect can be achieved either by holding the substrate in a fixed position, and moving the tip of the cutting tool in a vertically undulating curve, while maintaining the attitude of the cutting tool constant, or by vertical oscillation of the substrate while the cutting tool is moving in a straight line, or by simultaneous out-of-phase movement in the z-direction of both the cutting tool and the substrate. The choice of whether to move the cutting tool, or the substrate, or both during the cutting of the vee-groove will depend upon the design and functionality of the graver that controls the cutting tool and the fixture that holds the substrate.

A first, inconsequential, effect of this first mode of operation of the instant invention is the introduction of intersection errors in a pattern of ruled triangular cube corner elements. That is, even if the other two groove sets are formed entirely of straight grooves of the prior art, the vertically undulating groove root made in accordance with the first mode of operation of the instant invention will not always intersect the vertices of the other two groove sets at their exact points of intersection.

A second, consequential, effect of this first mode of operation of the invention is the purposeful introduction of variations or "errors" in the dihedral angles of cubes having a cube face formed by a side wall of an undulating groove. The frequency of the oscillation will be such that one period of oscillation spans several cube corner widths. Thus, for a single triangular cube described in part by a segment of an undulating groove root, the groove root segment is essentially descending, essentially ascending, or essentially level. The cube dihedral angle terminating at or near the lower end of a groove root segment will be slightly more obtuse than had the groove root been level. Similarly, the cube dihedral angle terminating at or near the raised end of a groove root segment will be slightly more acute, than had the groove root segment been level. For substantially equilateral triangle cube corners, the change to the cube dihedral angle is the groove slope angle divided by $\sqrt{6}$. Generally, where all three grooves that define a cube corner element are vertically undulating grooves, then for each such cube corner element, the deviation in depth of each groove will affect the two dihedral angles defined in part by that groove side wall, with the total effect on the dihedral angles being very nearly additive.

FIG. 10 summarizes the aberrations due to the first mode when the undulation is long enough that curvature within a single cube is insignificant. A male equilateral triangle cube corner is illustrated as formed by three grooves. Each of the grooves $g_1$, $g_2$, $g_3$ are shown rising by a corresponding angular amount $\delta_1$, $\delta_2$, $\delta_3$ in the direction indicated. If a $\delta$ value is negative, then the groove is instead falling. The three dihedral edges are labeled with their angle errors, $e_1$; $e_2$; $e_3$, that is, their deviations from perfect 90°. The dihedral angle errors are given by approximate equations (1)-(3).

$$e_1 \approx \frac{\delta_3 - \delta_2}{\sqrt{6}} \quad (1)$$

$$e_2 \approx \frac{\delta_1 - \delta_3}{\sqrt{6}} \quad (2)$$

$$e_3 \approx \frac{\delta_2 - \delta_1}{\sqrt{6}} \quad (3)$$

It will be appreciated that these equations require some adjustment for non-equilateral triangle cube corners.

Figure 2:
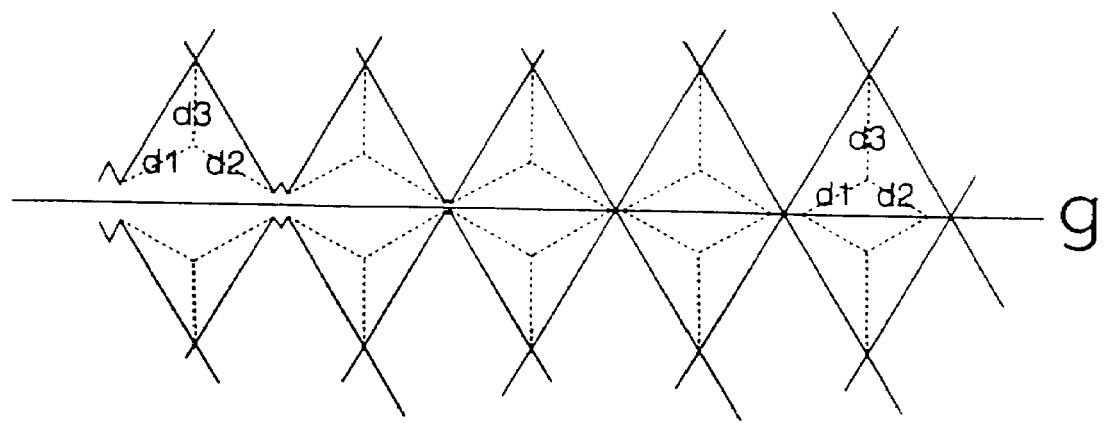
FIG. 2 illustrates a small portion of an array of cube corner elements made in accordance with the first described mode of practicing the invention, in which the magnitude of the groove undulation and the deviations of the dihedral angles are greatly exaggerated for the sake of illustration.

FIG. 2 roughly represents a portion of a single groove g ruled in accordance with the first mode of operation of the invention, viewed as a projection in the x-y plane, wherein the depth of the cutting tool is varied with respect to the plane of ruling. In this case, the tip of the cutting tool is rising as the tool moves along the groove g from left to right in the Figure.

In each cube, dihedral angle $d_1$ terminates at or near the lower end of the groove root segment, and dihedral angle $d_2$ terminates at or near the raised end of a groove root segment. Then in all ten cubes illustrated the dihedral angles $d_1$ will be slightly greater than 90°, and the dihedral angles $d_2$ will be slightly less than 90°. It may be seen in FIG. 2 that the dihedral angles $d_1$ and $d_2$ need not terminate exactly at groove root g, but can terminate near the groove root. It also may be seen that the dihedral angle $d_3$ is unaffected by the undulation of groove root g.

Second Mode—Horizontal Undulation

In a second mode of operation, the cutting tool is maintained at a constant attitude and a constant depth with respect to the substrate, and during the ruling of at least one vee-groove the cutting tool and the substrate oscillate with respect to one another in a horizontal direction sidewise to the direction of ruling. This will result in a groove of constant depth along the z-axis and substantially constant groove angle, and wherein the groove root is an undulating curve in a plane parallel to the x-y plane. It will be appreciated that the same effect can be achieved by holding the substrate in a fixed position, and moving the tip of the cutting tool in an undulating curve in the x-y plane, while maintaining the attitude of the cutting tool constant, or by horizontal oscillation of the substrate while the cutting tool moves in a straight line, or by simultaneous out-of-phase horizontal movement of both the cutting tool and the substrate. The choice of whether to move the cutting tool or the substrate, or both, will depend upon the design and functionality of the graver that controls the cutting tool and the fixture that holds the substrate. Such choices will be understood by those skilled in the ruling arts. Further, where the aim of the cutting tool is constant, rather than tangent to the undulating curve, there will be a very slight variation in groove angle, but this variation will not have a significant effect on divergence for the amplitudes of groove undulations applicable to the instant invention.

A first, inconsequential, effect of this second mode of operation of the instant invention is the introduction of intersection errors in a pattern of ruled triangular cube corner elements. That is, even if the other two groove sets are formed entirely of straight grooves of the prior art, the horizontally undulating groove root made in accordance with the second mode of operation of the instant invention will not always intersect the vertices of the other two groove sets at their exact points of intersection.

A second, consequential, effect of this second mode of operation of the invention is that the three corner angles of a triangular cube corner are modified. The dihedral angle of a triangle cube corner is made acute if it meets a triangle corner at which the angle has been modified to be smaller. Similarly the dihedral angle of a triangle cube corner is made obtuse if it meets a triangle corner at which the angle has been modified to be larger. For a substantially equilateral triangle cube corner, the change to a dihedral angle is approximately equal to the change to the corresponding triangle corner angle divided by $\sqrt{3}$. These changes to the dihedral angles of the affected cube corners result in a cube corner article having broader divergence.

FIG. 11 summarizes aberrations resulting from the second mode when the undulation is long enough that curvature within a single cube is insignificant. A male equilateral triangle cube corner is illustrated as formed by three grooves. Each of the grooves forming the triangle is shown rotated by a corresponding angular amount $\ddot{\delta}_1$, $\ddot{\delta}_2$, $\ddot{\delta}_3$ in the direction indicated. If a $\ddot{\delta}$ value is negative, then the groove is rotated oppositely. The three dihedral edges are labeled with their angle errors, $e_1$, $e_2$, $e_3$, that is, their deviations from perfect 90°: The dihedral angle errors are then given by approximate equations (4)-(6).

$$e_1 \approx \frac{\ddot{\delta}_3 - \ddot{\delta}_2}{\sqrt{3}} \qquad (4)$$

$$e_2 \approx \frac{\ddot{\delta}_1 - \ddot{\delta}_3}{\sqrt{3}} \qquad (5)$$

$$e_3 \approx \frac{\ddot{\delta}_2 - \ddot{\delta}_1}{\sqrt{3}} \qquad (6)$$

It will be appreciated that these equations require some adjustment for non-equilateral triangle cube corners.

Third Mode—Rocking To and Fro

In a third mode of operation of the invention, at least one vee-groove is ruled so that the movement of the tip of the cutting tool defines a straight groove root parallel to the x-y plane, and the attitude of the cutting tool oscillates within a plane containing the groove root. That is, the upper end of the cutting tool oscillates to and fro parallel to the direction of the groove. The attitude of the tool with respect to the substrate must be controlled as a function of the position of the cutting tool along the groove. In this third mode of operation, the center of oscillation is preferably the tip of the cutting tool. This mode produces a groove having groove walls that undulate such that the included groove angle expands and contracts along the length of the groove.

As the attitude of the cutting tool oscillates in accordance with this third mode of the invention, the included groove angle will vary continuously according to the well-known adjustment technique for groove angle. A vee cutter with included half-angle h, raked to angle R, cuts a groove of half-angle H, slightly larger than h, as given by equation (8).

$$H = \tan^{-1}\left(\frac{\tan h}{\cos R}\right) \qquad (8)$$

Regardless of the direction of rake, consider R positive. Consider a small variation, of magnitude much less than the rake itself, applied to R. The variation $\Delta R$ may be positive or negative. When the rake angle changes to $R+\Delta R$, the included half-angle H of the groove changes by an amount $\Delta H$ given by approximate equation (9).

$$\Delta H \approx \sin h \times \cos h \times \sin R \times \Delta R \qquad (9)$$

Thus a rake undulation in the vee cutter produces an approximately proportional undulation in the half-groove angle.

Figure 3:
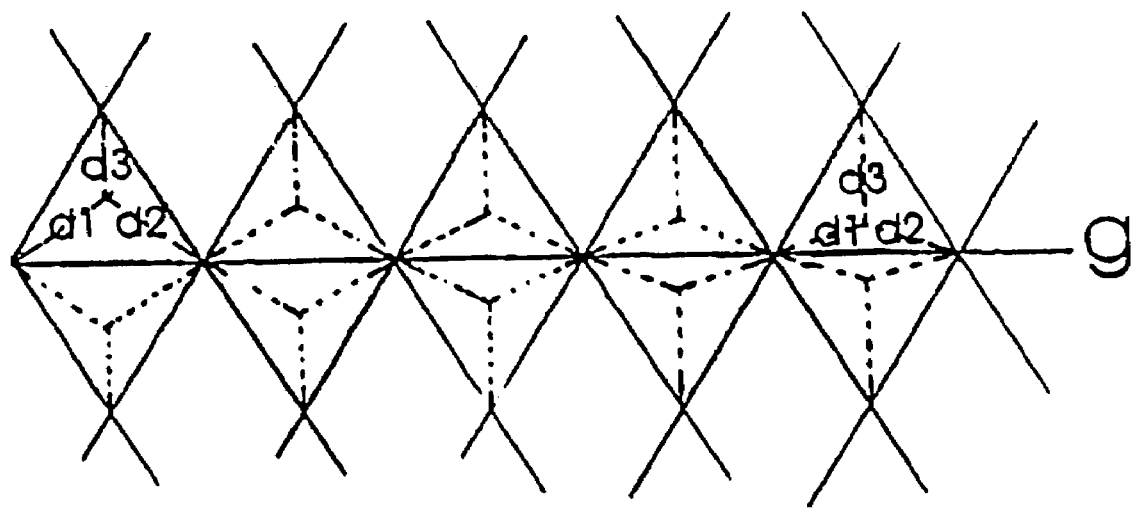
FIG. 3 illustrates a small portion of an array of cube corner elements made in accordance with the third described mode of practicing the invention, in which the magnitude of the groove undulation and the deviations of the dihedral angles are greatly exaggerated for the sake of illustration.

FIG. 3 illustrates ten cube corners along a portion of a groove that narrows from left to right. The groove walls produced in accordance with this third mode of the invention will intersect the x-y plane in undulatory curves corresponding to the variations in included groove angle. These variations of the groove angle along the length of the groove will result in variations in the dihedral angles of the cube corner elements defined in part by the groove side walls. For each of the cubes illustrated in FIG. 3, the two dihedral angles $d_1$ and $d_2$ are approximately equal, while their averaged value decreases from cube to cube from left to right along the illustrated portion of groove g. The dihedral angles $d_3$ remain unaffected. For substantially equilateral triangle cube corners, increasing a groove's included angle has the effect of increasing the cube dihedral angles formed in part from that groove by an amount equal to the groove's increase divided by $2\sqrt{2}$. Similarly, reducing a groove's included angle reduces corresponding cube dihedral angles by the same $2\sqrt{2}$ factor. For a substantially equilateral triangle cube corner formed from two or more modified grooves, the modifications to the cube dihedral angles are very nearly sums of the effects of the separate groove modifications. The purposely introduced variations in cube dihedral angles will result in a cube corner retroreflective article of broader divergence.

FIG. 12 summarizes the aberrations due to the third mode when the undulation is long enough that curvature within a single cube is insignificant. A male equilateral triangle cube corner is illustrated as formed by three grooves. Each of the grooves forming the triangle are designated by their half-groove angle errors, $\ddot{\delta}_1$, $\ddot{\delta}_2$, $\ddot{\delta}_3$, that is, their deviations from perfect 35.26° The three dihedral edges are labeled with their angle errors, $e_1$, $e_2$, $e_3$, that is, their deviations from perfect 90°. The dihedral angle errors are then given by approximate equations (10)-(12).

$$e_1 \approx \frac{\ddot{\delta}_3 + \ddot{\delta}_2}{\sqrt{2}} \qquad (10)$$

$$e_2 \approx \frac{\ddot{\delta}_1 + \ddot{\delta}_3}{\sqrt{2}} \qquad (11)$$

$$e_3 \approx \frac{\ddot{\delta}_2 + \ddot{\delta}_1}{\sqrt{2}} \qquad (12)$$

It will be appreciated that these equations require some adjustment for non-equilateral triangle cube corners.

Fourth Mode—Rocking Side to Side

Whereas the foregoing third mode of operation can be understood as "forward-backward" oscillation of the attitude of the cutting tool, the fourth mode of operation of the invention uses "side-to-side" oscillation of the cutting tool. That is, the tip of the cutting tool still defines a straight groove root parallel to the x-y plane, while the attitude of the cutting tool oscillates within planes perpendicular to the groove root. That is, the attitude oscillates transverse to the direction of the ruling. In this method, while the magnitude of the groove angle itself will not change along the length of the groove, the progressive change in attitude of the cutting tool along the groove will result in variations in the angle between the x-y plane and the groove walls that produce the cube corner elements on either side of the groove. The dihedral angles of the cube corner elements defined in part by the undulating groove surfaces will thereby be modified, similarly to the third mode of operation of the invention. The identical equations (10)-(12) apply to this fourth mode. These errors in the dihedral angles will in turn result in a cube corner retroreflective article of broader divergence.

Curvature

It is contemplated that the undulatory method of the instant invention can give deviations from flatness of the ruled cube corner faces on the order of 0.01°. For the sizes of cube corners contemplated, this will be just a small fraction of a wavelength of visible light. This effect will be insignificant, particularly when the retroreflective article made from the cube corner array is sheeting, retroreflective fabric, or traffic control devices.

A Difference Among the Modes

For either equations (1)-(3) (i.e., the first mode of operation) or equations (4)-(6) (i.e., the second mode of operation) it is seen that equation (7) must hold.

$$e_1 + e_2 + e_3 = 0 \quad (7)$$

Thus, the first and second modes, applied as described, result in cube corners with no net dihedral angle error. It is sometimes desireable to have net dihedral angle error, as shown in Example 4 below. To produce net error by the first or second modes, it is a simple matter to incorporate a bias error beneath the errors produced by undulation. For example, the groove angles can be chosen different from the perfect 70.53°, and these imperfect grooves can be subjected to vertical (first mode) or horizontal (second mode) undulation. To determine the imperfect groove angles desired for the bias, equations (10)-(12) may be solved for the groove errors in terms of the dihedral errors. This gives new equations (13)-(15).

$$\ddot{\delta}_1 \approx \frac{-e_1 + e_2 + e_3}{\sqrt{2}} \quad (13)$$

$$\ddot{\delta}_2 \approx \frac{+e_1 - e_2 + e_3}{\sqrt{2}} \quad (14)$$

$$\ddot{\delta}_3 \approx \frac{+e_1 + e_2 - e_3}{\sqrt{2}} \quad (15)$$

Again, it will be appreciated that these equations require some adjustment for non-equilateral triangle cube corners. The $\ddot{\delta}_1, \ddot{\delta}_2, \ddot{\delta}_3$ from equations (13)-(15) will serve as a biasing adjustment to the groove angles which will then be undulated to produce the additional errors according to the first or second mode. When using the third or fourth modes, no separate biasing is necessary, since the biases discovered from equations (13)-(15) can be parts of the $\ddot{\delta}_1, \ddot{\delta}_2, \ddot{\delta}_3$ of the undulation.

In each of the foregoing modes of operation of the invention, the result will be that the dihedral angles of the cube corner elements formed by the grooves cut by the inventive method will differ from one cube corner element to the next. This non-equivalency of the cube corner elements will broaden, in a controlled manner, the divergence of a retroreflective structure made from an array including the non-equivalent cube corner elements.

It will be appreciated that the modes of operation described above can be used in any combination. Where the cube corner elements are made from three intersecting sets of approximately parallel grooves, the groove variations can be made in any number of grooves in a set, and in one, two, or three sets. If grooves in more than one set are varied, the result will be, in general, a randomized combination of three dihedral angles in each cube.

Also each undulation can be a compound undulation, produced by a combination of any number of the basic four modes, or any other mode, of oscillation. For example the graver can be oscillating both vertically and horizontally at once (mode 1+mode 2), or it can be rocking to-and-fro and side-to-side at once (mode 3+mode 4), or any of the nine other logical combinations. In compound modes, the amplitude and length of undulations need not agree. In all such cases, the equation sets (1)-(3), (4)-(6), and (10)-(12) can be separately applied to obtain the dihedral angle errors for one cube, and the separate results added to determine the dihedral angle errors of the compound mode undulation.

FIGS. 10-12 and corresponding equation sets (1)-(3), (4)-(6), and (10)-(12) show the effect of the different modes of the invention on the aberration of a single cube corner. The purpose of this invention is to enable the optical designer to produce an array with a great variety of aberrated cube corners. Each triangle cube corner has six contiguous neighbors (two at each of its vertices) with its same orientation. Each of these neighbors of the first cube corner will in general have quite different aberrations from the first, because these neighbors will be formed from one groove in common with the first, which will have changed slightly, and two grooves not in common with the first, which can have undulations out of phase with the undulations of the corresponding grooves forming the first cube. Those skilled in the art will recognize that not all geometrical light patterns are achievable by the present invention. For one thing, as shown in the Yoder paper, there are limits on the geometrical light distributions achievable by dihedral aberrations. For another, not all distributions of dihedral aberration are achievable by the present invention. Any technique that randomly combines three groove variations must include all "cross terms", that is, for any part of the groove 1 variation, any part of the groove 2 variation, and any part of the groove 3 variation, these three parts will occur together in forming a cube corner somewhere in the array. This makes the invention more suitable for smooth spreadings of the retroreflection than for precise arrangements of the light, as illustrated in Examples 3-6 described below.

COMPARATIVE EXAMPLES

All of the following Examples 1-6 will be based on an uncanted acrylic triangle cube corner having 0.2 mm base dimension corresponding to 0.082 mm ruling depth. Observation angles from 0° to 3° will be considered, while entrance angle is fixed at 0°. The light source is assumed to have the spectral power distribution of CIE Illuminant A, corresponding to an incandescent lamp, and the detector is assumed to have the spectral sensitivity function CIE V(λ), corresponding to human photopic vision.

All of the example outcomes are results of optical calculation. Undulatory modelings are based on 1000 randomly generated cube corners. A shorthand has been employed in describing sinusoidal undulations: N[sin] will be understood as undulation of degree such that the single such groove contributes up to N arc minutes to dihedral angle error.

Example 1

Prior Art

Figure 4A:
FIGS. 4A-D illustrate diffraction patterns from four different prior art unaberrated cube corners. The patterns show observation angle from 0° to 3° over all rotation angles. The entrance angle is 0°. The illustrations scale the pattern logarithmically so that one step corresponds to retroreflectance difference of approximately 2.5 times.
Figure 4A:
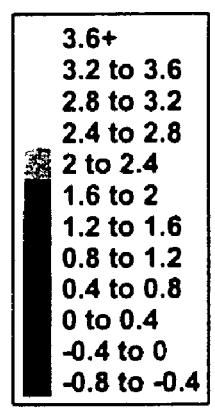
Figure 4B:
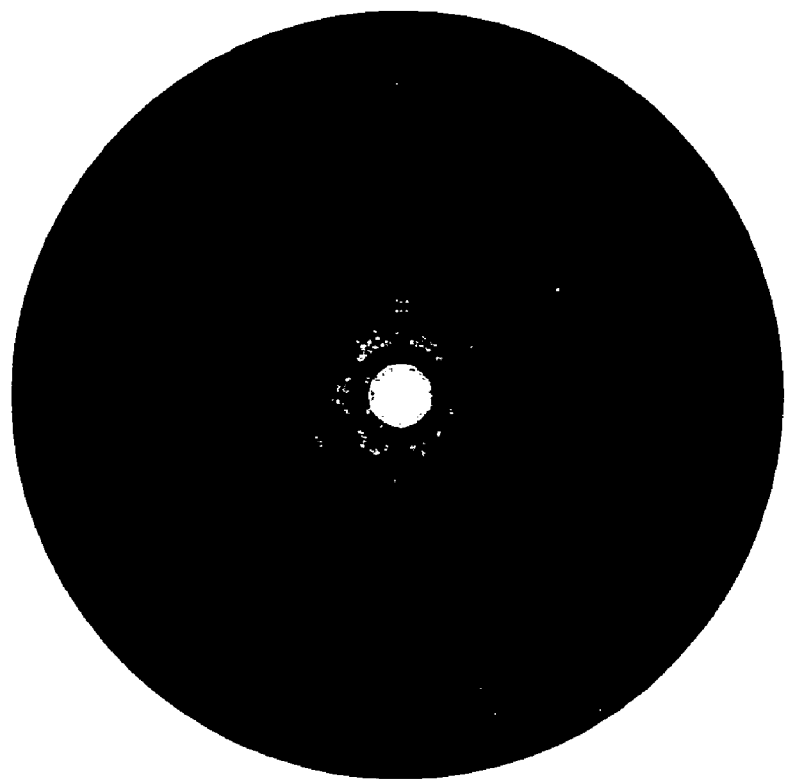
Figure 4B:
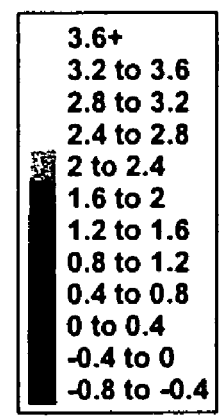
Figure 4C:
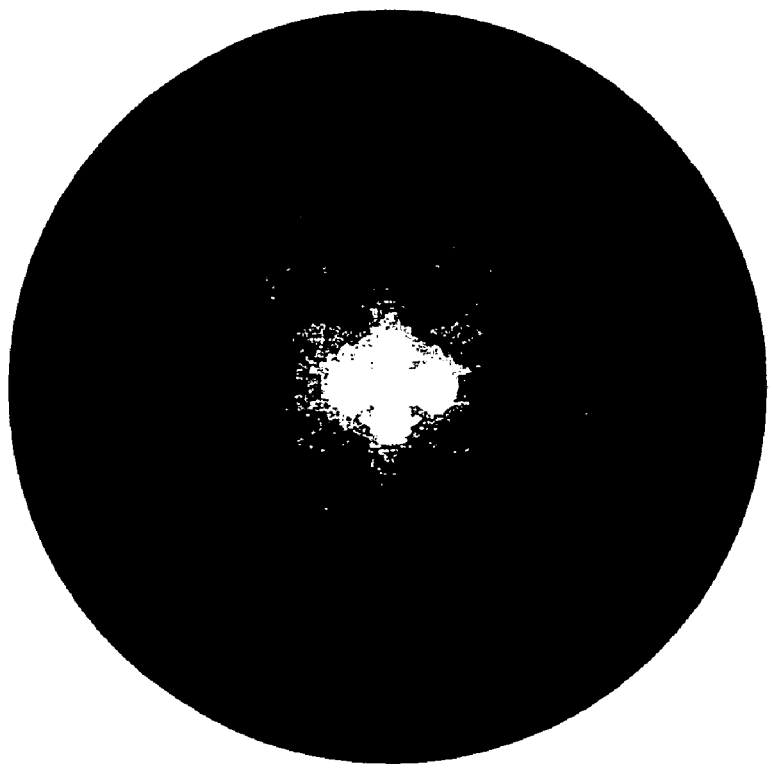
Figure 4C:
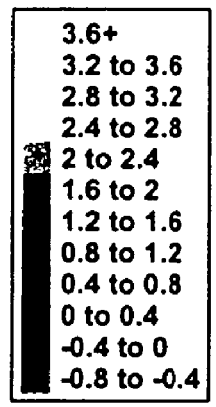
Figure 4D:
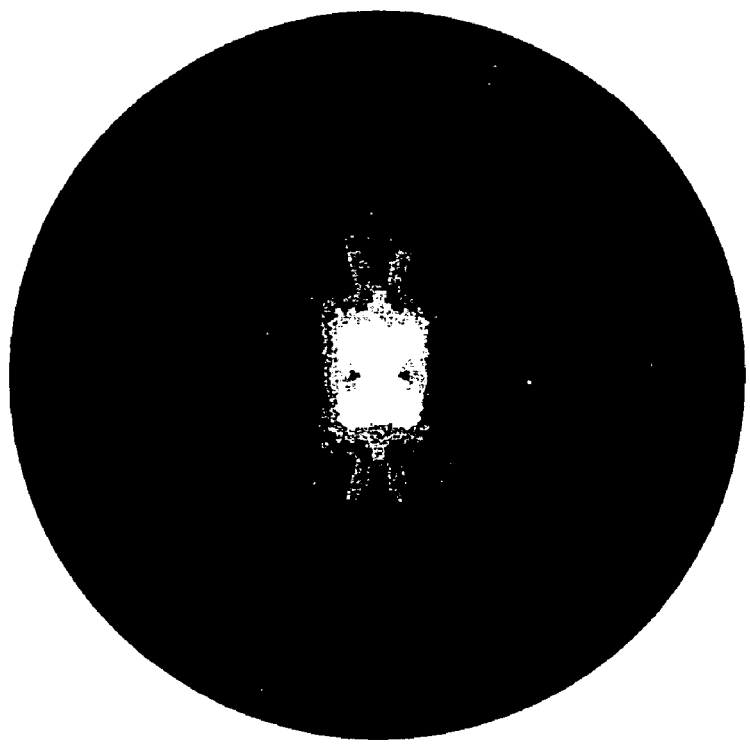
Figure 4D:
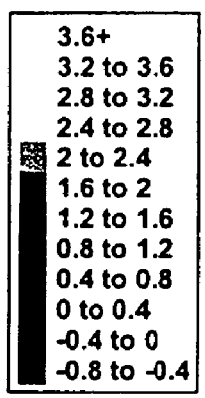

The first example is the perfect, unaberrated cube corner with retroreflected light pattern shown in FIG. 4A. The geometric light pattern must have zero divergence, but the cube size introduces noticeable diffraction, as summarized in Table 1. The observation angle aspect of the diffraction light pattern is also shown in FIG. 9 as the curve labelled "aberrationless". The curve in FIG. 9 is derived from FIG. 4A.

The geometrical light pattern from a single cube corner consists of six punctal spots, as explained in the cited work of P. R. Yoder, Jr. An unaberrated cube corner produces its six spots in coincidence. In the following Examples 2-6 different techniques are used to aberrate cube corners. For purposes of comparison, the aberrations in each of these examples are chosen so that the geometrical light pattern in each case has average divergence approximately 1.1°, where the divergence is measured from the centroid of all the punctal spots. All illustrations show diffraction light patterns rather than geometrical patterns, as this is what small cube corners really produce.

Example 2

Prior Art

Figure 5:
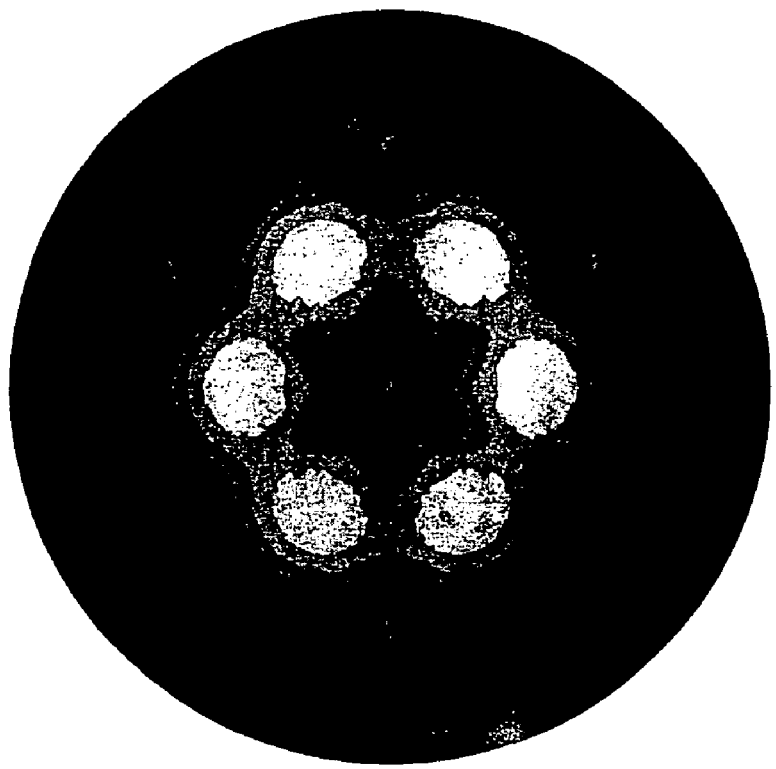
FIG. 5 illustrates the calculated diffraction pattern for the prior art cube corner of FIG. 4A, but with a simple aberration of +14 arc minutes on each dihedral angle. The geometric spot pattern has an average divergence of 1.1°.
Figure 5:
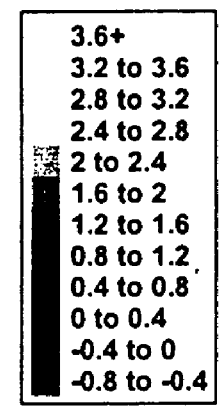

Example 2 represents the simplest way known to the prior art to make an array of aberrated cube corners having average geometric divergence of 1.1°. Each dihedral angle of each cube corner is made 14 minutes greater than the perfect 90°. FIG. 5 shows the resulting diffraction pattern. Most of the energy is near the characteristic six punctal spots as described above, which diffraction joins into a ring. FIG. 9 shows the ring as a hump in the curve labeled 14,14,14, peaking at about 1.1°. The average intensity at 1.1° observation angle is about eight times the intensity at 0° observation angle. A retroreflector of this kind would not have road applications since it only functions well over such a short range of observation angles that, at any distance, the full range of vehicles (from trucks to cars) could not benefit. It could have specialized applications for instrumentation.

Figure 6A:
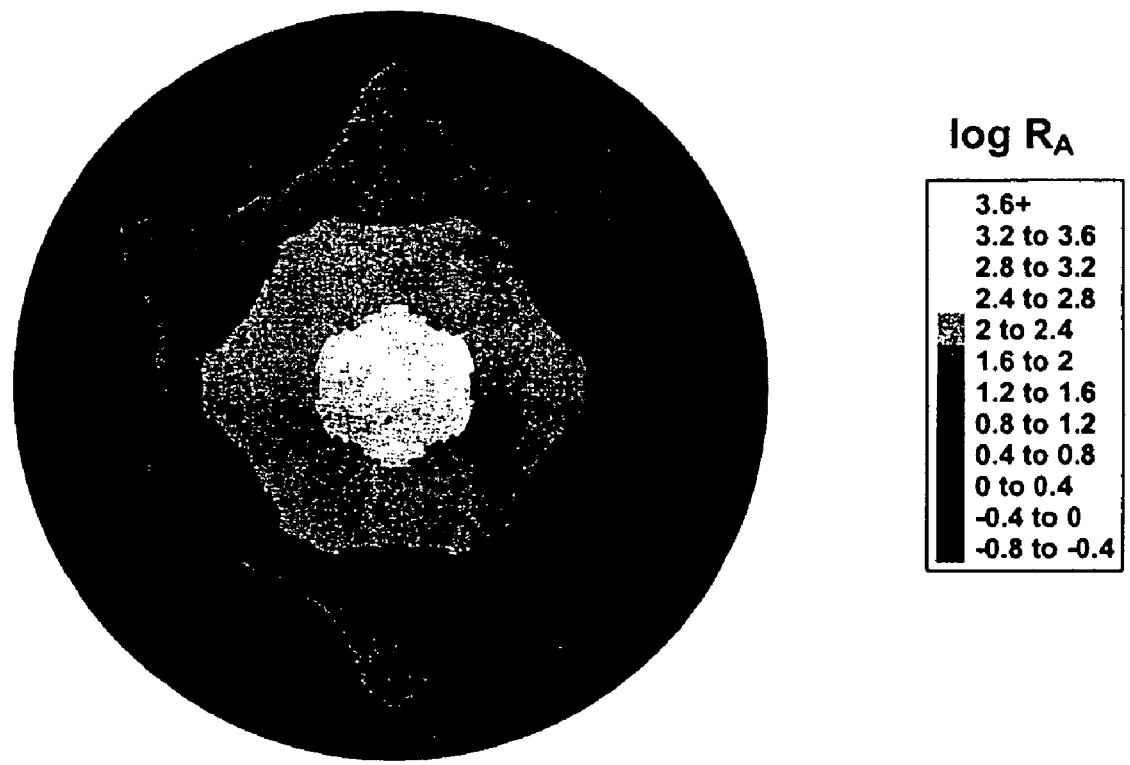
FIG. 6A uses a sinusoidal undulation on each of three grooves sufficient to give the geometric pattern an average divergence of 1.1°.
Figure 6B:
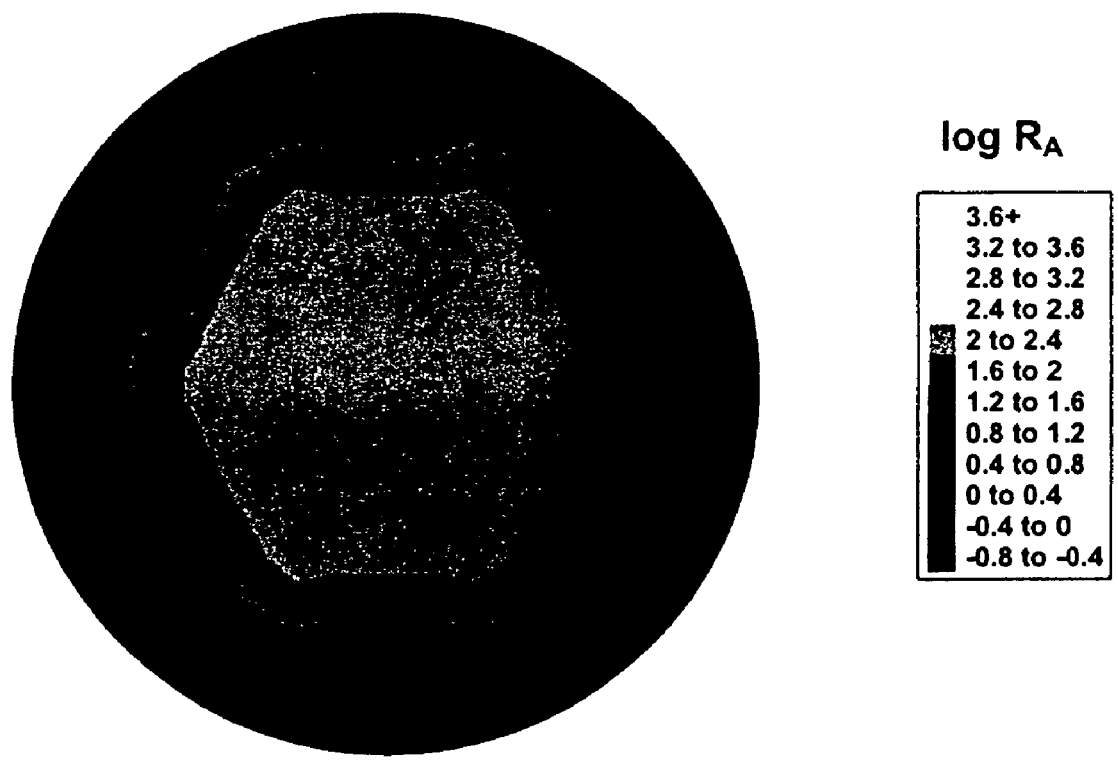
FIG. 6B uses a combination of a simple aberration of 9 arc minutes on each dihedral angle with a sinusoidal undulation on each of three grooves sufficient to give the geometric pattern an average divergence of 1.1°.
Figure 7A:
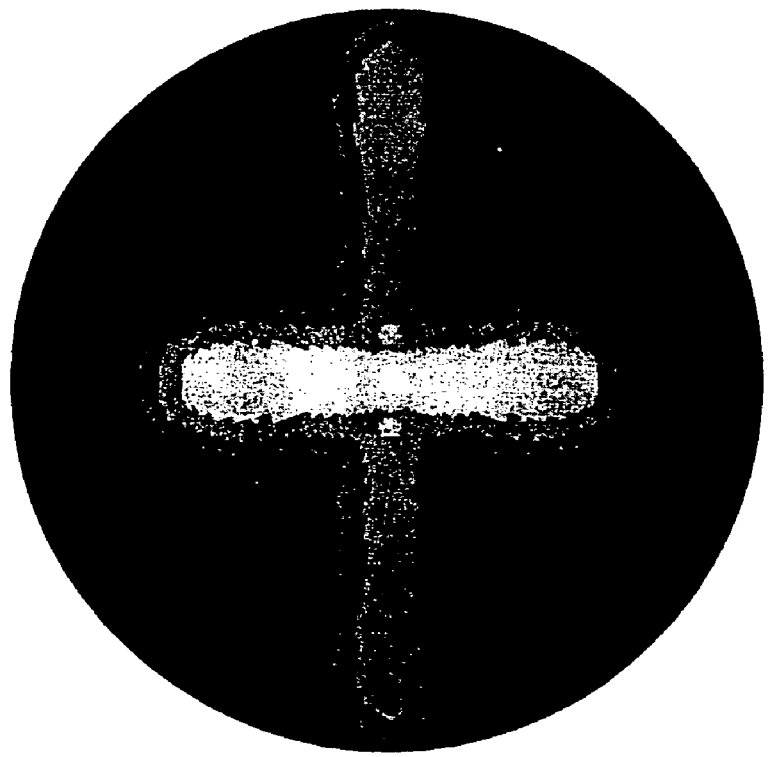
FIGS. 7 A-B illustrate calculated diffraction patterns for the cube corner of FIG. 4A, but with aberrations in accordance with the first mode of the present invention being applied unequally to the three grooves. For FIG. 7A only one of the three grooves receives sinusoidal undulation. For FIG. 7B two of the three grooves receive sinusoidal undulation. For each of these designs, the geometric light pattern has an average divergence of 1.1°.
Figure 7A:
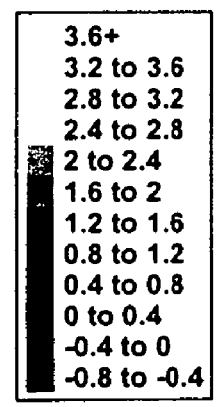
Figure 7B:
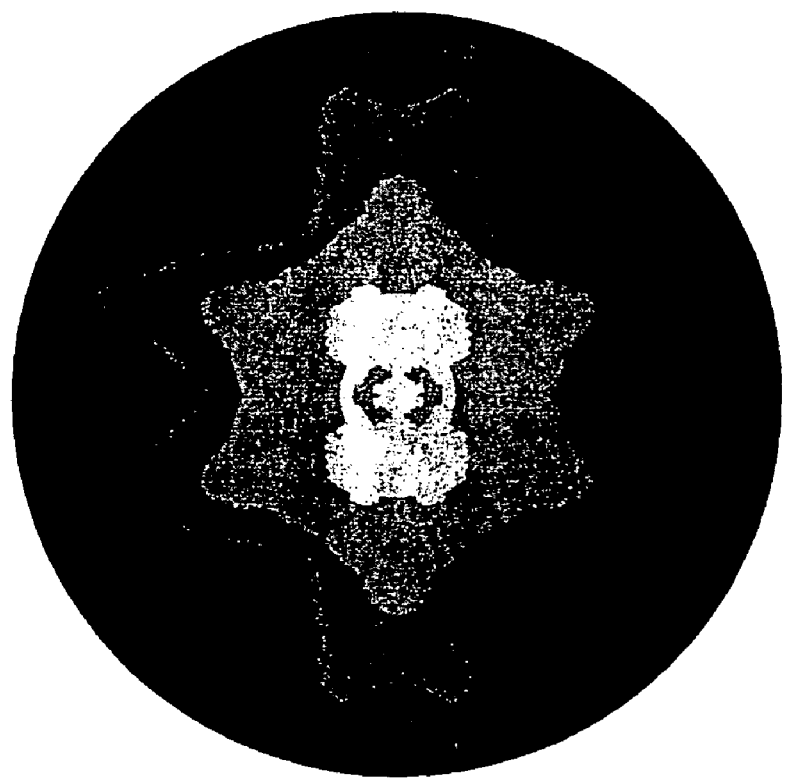

Examples 3-6 illustrate rulings that can be made in accordance with the instant invention. The illustrative rulings have planned aberrations that result in broadened divergence profiles. In all these examples, the undulations are adjusted to give the same average geometric divergence, 1.1°, as in prior art Example 2. FIGS. 6A and 6B illustrate smooth divergence spreadings achieved with the rulings of Examples 3 and 4, while FIGS. 7A and 7B show some limited aiming capabilities achieved with the rulings of Examples 5 and 6. Table 2 gives the ruling details corresponding to Examples 3-6.

TABLE 2

Ruling details using vertical undulation

| EXAMPLE | SHORTHAND | FIG. | FORM | PITCH | AMPLITUDE | START |
|---|---|---|---|---|---|---|
|  | 33[sin ± ½ sin²] |  | sin ± ½ sin² | 4 mm | 0.0097 mm | random |
| 3 | 20[sin] | 6A | sin | 4 mm | 0.0116 mm | random |
| 4 | 9 + 15[sin] | 6B | sin | 4 mm | 0.0087 mm | random |
| 5 | 35[sin] on G3 | 7A | sin | 4 mm | 0.0204 mm | random |
| 6 | 24[sin] on G1 & G2 | 7B | sin | 4 mm | 0.0135 mm | random |

FIG. 9 illustrates the observation angularity achieved with the rulings of Examples 1-4, as well as the 33[sin±½ sin²]

Example 3

For Example 3 sinusoidal vertical undulation is assumed according to Mode 1 of this invention. Ruling dimensions are shown in Table 2 under 20[sin]. FIG. 6A shows the resulting calculated diffraction pattern. It has a gentle central peak and is uncluttered with diffraction and aberration artifacts out to about 2° observation angle. This is the beneficial result of the cube corners not being alike as they were in Examples 1 and 2. FIG. 9 shows the observation angularity of Example 3 as curve 20[sin]. Its intensity at 1.1° is only 37% that of prior art Example 2 at 1.1°. However its intensity at 0° is 16 times that of prior art Example 2, and its intensity at 2° is 2.2 times that of prior art Example 2. Unlike Example 2, a retroreflector having the aberrated cube corners of Example 3 is not limited to close applications, but performs well over a broad distance range.

Example 4

For Example 4 sinusoidal vertical undulation according to Mode 1 is assumed in combination with a bias of 9 arc minutes error on each dihedral angle. That is, all the grooves are initially planned to make 9 arc minutes of dihedral error and a sinusoidal undulation 15/20 as great as that of Example 3 is superimposed on this. Ruling dimensions are given in Table 2 under 9+15[sin]. FIG. 6B shows the resulting diffraction pattern, practically flat to about 1.5°. It must be appreciated that the diffraction pattern illustrations are logarithmically scaled and one step corresponds to difference in retroreflectance of approximately 2.5 times. FIG. 9 shows that the observation angularity of Example 4 is nearly flat to about 1.5°. Example 4 could function as a close distance retroreflector in road applications.

Example 5

Example 5 shows the effect of sinusoidal vertical undulation according to Mode 1 but assumed for only one set of grooves, G3, of the three sets of grooves G1, G2, G3 ruled to make triangular cube corners. Ruling dimensions are given in Table 2 under "35[sin] on G3." Equations (1)-(3) show how this affects two of the three dihedral angles. FIG. 7A shows the diffraction pattern. This example illustrates how the method can produce patterns with directed observation angularity. This is the reason this Example 5 is not included among the curves of FIG. 9, which are averages over all directions.

Example 6

Example 6 shows the effect of sinusoidal vertical undulation according to Mode 1 assumed for two of the three groove sets. Ruling dimensions are given in Table 2 under "24[sin] on G1&G2." Equations (1)-(3) show how this affects two of the three dihedral angles. FIG. 7B shows the diffraction pattern. This example illustrates a different type of directed observation angularity that can be achieved with the method of the instant invention.

It will be appreciated that while Examples 3-6 use Mode 1, using the dimensions in Table 2, Mode 2 could have been used with different dimensions to give identical results and Modes 3 or 4 to give almost identical results.

Preferably, the entire desired range of divergence will be provided over a short increment of groove length, in order to avoid a spotty appearance. For retroreflective road sign applications there should be no patches larger than about 4 mm diameter visibly different from adjacent patches. Practical undulatory methods are possible in which the graver makes its entire cycle of change within 4 mm. For the first or second modes of the invention, typical groove undulations have approximately 10 micron amplitude over 4 mm cycle. Using the first or second modes of the instant invention, sinusoidal undulation on all three of the grooves results in cube corner dihedral angle errors having a distribution curve that can be described as resembling the shape of a smaller triangle mounted upon a larger trapezoid.

It may be seen that, in each single-mode of operation of the invention, the amplitude of the movement of either the cutting tool, or the substrate, or both, can be either constant or variable, both along the length of a single groove and from one groove to the next, thus facilitating controlled broadening of observation angularity anywhere on the ruled substrate as desired by the ruling designer. When modes are compounded, they need not agree in amplitude or length. Further, such controlled variability can be introduced into one, two, or all three of the groove sets, in the ruling of triangular microcubes, and into some or all of the grooves in each groove set.

The rulings made by the methods described herein can be used to make retroreflective products according to methods known in the art. For example, the ruled surface can be replicated through successive generations, and the replicates can be assembled together either with or without replicates of unaberrated cube corner arrays. Seamless copies of the assembly can be made such as by electrodeposition of nickel to provide tools of uniform thickness. Tools having such patterns of cube corner elements can be used to manufacture retroreflective products such as sheeting. Such manufacturing methods are known in the art and include, for example, embossing, casting, and compression molding. The tool of the instant invention can be used in each of these manufacturing methods and variations thereof.

The invention has been described herein in terms of preferred embodiments and methodologies. Those skilled in the art will recognize that variations can be made to the embodiment disclosed herein within the scope of the invention.

What is claimed is:

1. An article having on a surface thereof a pattern of cube corner elements defined by intersecting vee-grooves, said surface lying parallel to the x-y plane of an orthogonal x-y-z reference system, each vee-groove comprising two groove side walls intersecting at a groove root, wherein at least one of said vee-grooves is an undulating groove, wherein said groove root of said undulating groove is a curve undulating in a plane perpendicular to the x-y plane.

2. An article having on a surface thereof a pattern of cube corner elements defined by intersecting grooves, the surface lying parallel to the x-y plane of an orthogonal x-y-z reference system, each groove comprising two groove side walls intersecting at a groove root, wherein at least one of the grooves is an undulating groove extending in a path in the y-direction and having a depth in the z-direction, wherein the groove root of the undulating groove is a curve undulating in a plane perpendicular to the x-y plane whereby the depth of the groove root undulates in the y-direction.

3. The article of claim 2, wherein the groove root follows a straight path in the y-direction.

4. The article of claim 2, wherein the groove root follows a curved path in the y-direction.

5. The article of claim 2, wherein the groove angle remains constant along the path of the undulating groove in the y-direction.

6. The article of claim 2, wherein the groove angle expands and contracts along the path of the undulating groove in the y-direction.

\* \* \* \* \*